US008676152B2

United States Patent
McQuaide, Jr.

(10) Patent No.: US 8,676,152 B2
(45) Date of Patent: *Mar. 18, 2014

(54) ALARM SYSTEMS HAVING MULTIPLE COMMUNICATION ALTERNATIVES FOR CONTACTING A MONITORING SERVICE AND METHODS OF OPERATING THE SAME

(71) Applicant: AT&T Intellectual Property I, L.P., Atlanta, GA (US)

(72) Inventor: Arnold Chester McQuaide, Jr., Berkeley Lake, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/908,591

(22) Filed: Jun. 3, 2013

(65) Prior Publication Data

US 2013/0267191 A1 Oct. 10, 2013

Related U.S. Application Data

(63) Continuation of application No. 11/488,502, filed on Jul. 18, 2006, now Pat. No. 8,457,589.

(51) Int. Cl.
*H04M 11/04* (2006.01)

(52) U.S. Cl.
USPC ........ 455/404.1; 455/418; 455/425; 455/445; 455/67.11; 455/423; 379/45

(58) Field of Classification Search
USPC ............................ 455/404.1, 404.2, 423–425, 455/67.11–67.16, 445; 379/45
See application file for complete search history.

(56) References Cited

U.S. PATENT DOCUMENTS

| | | | |
|---|---|---|---|
| 4,577,182 A | 3/1986 | Millsap et al. | |
| 4,993,059 A | 2/1991 | Smith et al. | |
| 5,777,551 A | 7/1998 | Hess | |
| 5,960,367 A | 9/1999 | Kita | |
| 6,088,600 A | 7/2000 | Rasmussen | |
| 6,356,192 B1 | 3/2002 | Menard et al. | |
| 7,046,985 B2 | 5/2006 | Seales et al. | |
| 7,058,385 B2 | 6/2006 | Lauper | |
| 7,085,551 B1 | 8/2006 | Bonner et al. | |
| 7,130,609 B2 | 10/2006 | Cardina et al. | |
| 7,221,928 B2 | 5/2007 | Laird et al. | |
| 7,400,886 B2 | 7/2008 | Sahim et al. | |
| 7,583,191 B2 | 9/2009 | Zinser | |
| 7,786,891 B2 | 8/2010 | Owens et al. | |
| 7,809,367 B2 * | 10/2010 | Hellaker | 455/423 |
| 7,817,029 B1 | 10/2010 | Hillenburg et al. | |

(Continued)

OTHER PUBLICATIONS

U.S. Office Action dated May 29, 2009 in U.S. Appl. No. 11/488,502.

(Continued)

*Primary Examiner* — Sharad Rampuria
(74) *Attorney, Agent, or Firm* — Hartman & Citrin LLC

(57) ABSTRACT

An alarm system includes a mobile terminal and an alarm controller. The alarm controller is configured to communicate with the mobile terminal, to attempt a call to a monitoring service using a first communication technique responsive to detection of an alarm condition, and to attempt a call to the monitoring service using the mobile terminal if the call attempt using the first communication technique is unsuccessful.

20 Claims, 4 Drawing Sheets

(56) References Cited

U.S. PATENT DOCUMENTS

| | | | |
|---|---|---|---|
| 7,929,942 B2 * | 4/2011 | Schefczik et al. | 455/404.1 |
| 8,013,734 B2 | 9/2011 | Saigh et al. | |
| 8,045,969 B2 * | 10/2011 | Jin et al. | 455/418 |
| 8,058,984 B2 | 11/2011 | Liu | |
| 8,437,732 B2 * | 5/2013 | Hursey et al. | 455/404.1 |
| 8,457,589 B2 * | 6/2013 | McQuaide, Jr. | 455/404.1 |
| 8,457,616 B2 * | 6/2013 | Marathe et al. | 455/418 |
| 2002/0151302 A1 | 10/2002 | Schmidt et al. | |
| 2005/0070272 A1 | 3/2005 | Marangos | |
| 2006/0111058 A1 | 5/2006 | Grant et al. | |
| 2009/0045952 A1 | 2/2009 | Bahari | |
| 2012/0092158 A1 | 4/2012 | Kumbhar et al. | |
| 2012/0122418 A1 | 5/2012 | Hicks, III | |
| 2013/0078940 A1 * | 3/2013 | Patil et al. | 455/404.1 |

OTHER PUBLICATIONS

U.S. Office Action dated Nov. 9, 2009 in U.S. Appl. No. 11/488,502.
U.S. Office Action dated Feb. 22, 2010 in U.S. Appl. No. 11/488,502.
U.S. Office Action dated Jul. 12, 2010 in U.S. Appl. No. 11/488,502.
U.S. Office Action dated Nov. 17, 2010 in U.S. Appl. No. 11/488,502.
U.S. Office Action dated Mar. 24, 2011 in U.S. Appl. No. 11/488,502.
U.S. Office Action dated Sep. 13, 2011 in U.S. Appl. No. 11/488,502.
U.S. Office Action dated Mar. 9, 2012 in U.S. Appl. No. 11/488,502.
U.S. Notice of Allowance dated Feb. 5, 2013 in U.S. Appl. No. 11/488,502.
Advisory Action mailed Jul. 9, 2012 in U.S. Appl. No. 11/488,502.

* cited by examiner

US 8,676,152 B2

ALARM SYSTEMS HAVING MULTIPLE COMMUNICATION ALTERNATIVES FOR CONTACTING A MONITORING SERVICE AND METHODS OF OPERATING THE SAME

This patent application is a Continuation of U.S. patent application Ser. No. 11/488,502, now U.S. Pat. No. 8,457,589, entitled "Alarm Systems having Multiple Communication Alternatives for Contacting a Monitoring Service and Methods of Operating the Same," filed Jul. 18, 2006, which is herein incorporated by reference in its entirety.

BACKGROUND OF THE INVENTION

The present invention relates to alarm systems, and, more particularly, alarm systems that communicate with a monitoring service.

Home security is generally considered a rapidly growing field. Most conventional alarm systems have a similar architecture that includes a central control box, which monitors several motion detectors and/or perimeter guards and sounds an alarm if any of these detectors/guards are triggered. When a detector/guard is triggered, the control box may perform several operations, such as activate a siren or other loud alarm noise, flash outdoor/indoor lights, and/or initiate a call via a telephone auto-dialer. The sirens and lights may serve various functions, such as alerting occupants and neighbors that someone has broken into the house, scaring the intruder so as to drive the intruder away, and/or signal the police which house has been broken into. The telephone auto-dialer may dial the police directly and play a pre-recorded message giving the address of the house and any other relevant information. This message will usually play over and over so that the police will hear it even if the call is put on hold for some time. The auto-dialer may also dial the security company that installed the equipment, for example. In this case, the control box can provide specific information about the intrusion, such as which circuits or motion detectors were activated, etc. The security company may relay this information to the police.

Unfortunately, if an intruder has cut or otherwise damaged the telephone line for the property, then the auto-dialer may not be able to successfully contact the police and/or monitoring service.

SUMMARY

According to some embodiments of the present invention, an alarm system includes a mobile terminal and an alarm controller. The alarm controller is configured to communicate with the mobile terminal, to attempt a call to a monitoring service using a first communication technique responsive to detection of an alarm condition, and to attempt a call to the monitoring service using the mobile terminal if the call attempt using the first communication technique is unsuccessful.

In other embodiments, the alarm controller is further configured to attempt a Universal Mobile Telecommunications System (UMTS) call to the monitoring service using the mobile terminal if the call attempt using the first communication technique is unsuccessful.

In still other embodiments, the mobile terminal is configured to communicate with the alarm controller via a direct wired or wireless communication interface.

In still other embodiments, the direct wireless communication interface comprises one of a Bluetooth and a IEEE 802.11b/g Wireless Local Area Network (WLAN) communication protocol.

In still other embodiments, the alarm system further comprises a cradle that is configured to receive the mobile terminal therein, the cradle being communicatively coupled to the alarm controller.

In still other embodiments, the cradle comprises a phone interface that is configured to activate the mobile terminal responsive to detection of the alarm condition at the alarm controller.

In still other embodiments, the alarm controller is configured to communicate with the cradle via a direct wired or wireless communication interface comprising one of a Bluetooth and a IEEE 802.11b/g Wireless Local Area Network (WLAN) communication protocol.

In still other embodiments, the cradle is configured to communicate with the mobile terminal via a direct wired or wireless communication interface comprising one of a Bluetooth and a IEEE 802.11b/g Wireless Local Area Network (WLAN) communication protocol.

In still other embodiments, the first communication technique is a wireline call via a wireline connection.

In still other embodiments, the alarm controller further comprises a switch that is configured to select the wireline connection for communication responsive to detection of the alarm condition and to select the mobile terminal for communication responsive to an unsuccessful wireline call attempt.

In further embodiments of the present invention, an alarm system is operated by operating an alarm controller to attempt a call to a monitoring service using a first communication technique responsive to detection of an alarm condition. If the call attempt using the first communication technique is unsuccessful, then the alarm controller is operated to attempt a call to the monitoring service using a mobile terminal.

In still further embodiments, operating the alarm controller to attempt the call to the monitoring service using the mobile terminal comprises operating the alarm controller to attempt a Universal Mobile Telecommunications System (UMTS) call to the monitoring service using the mobile terminal.

In still further embodiments, operating the alarm controller to attempt the call to the monitoring service using the mobile terminal comprises communicating with a mobile terminal via a direct wired or wireless communication interface to attempt the call.

In still further embodiments, the direct wireless communication interface comprises one of a Bluetooth and a IEEE 802.11b/g Wireless Local Area Network (WLAN) communication protocol.

In still further embodiments, the method further comprises providing a cradle, receiving the mobile terminal in the cradle, and activating the mobile terminal in the cradle responsive to detection of the alarm condition.

In still further embodiments, the method further comprises operating a switch to connect the alarm controller to a wireline connection to attempt the call to the monitoring service using the first communication technique, and operating the switch to connect the alarm controller to the mobile terminal if the call attempt using the first communication technique is unsuccessful.

In other embodiments, an alarm system is operated by detecting an alarm condition, determining if dial tone is available on a wireline connection, placing a wireline call to a monitoring system on the wireline connection if dial tone is available, determining if a mobile terminal is active if dial tone is not available on the wireline connection, and placing a wireless call to the monitoring system using the mobile terminal if the mobile terminal is active.

In still other embodiments, placing the wireless call to the monitoring service comprises communicating with the mobile terminal via a direct wired or wireless communication interface to place the wireless call.

In still other embodiments, the method further comprises providing a cradle, receiving the mobile terminal in the cradle, and activating the mobile terminal in the cradle responsive to detection of the alarm condition.

In still other embodiments, the method further comprises operating a switch to connect to the wireline connection to place the wireline call, and operating the switch to connect to the mobile terminal to place the wireless call.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

Figure 1:
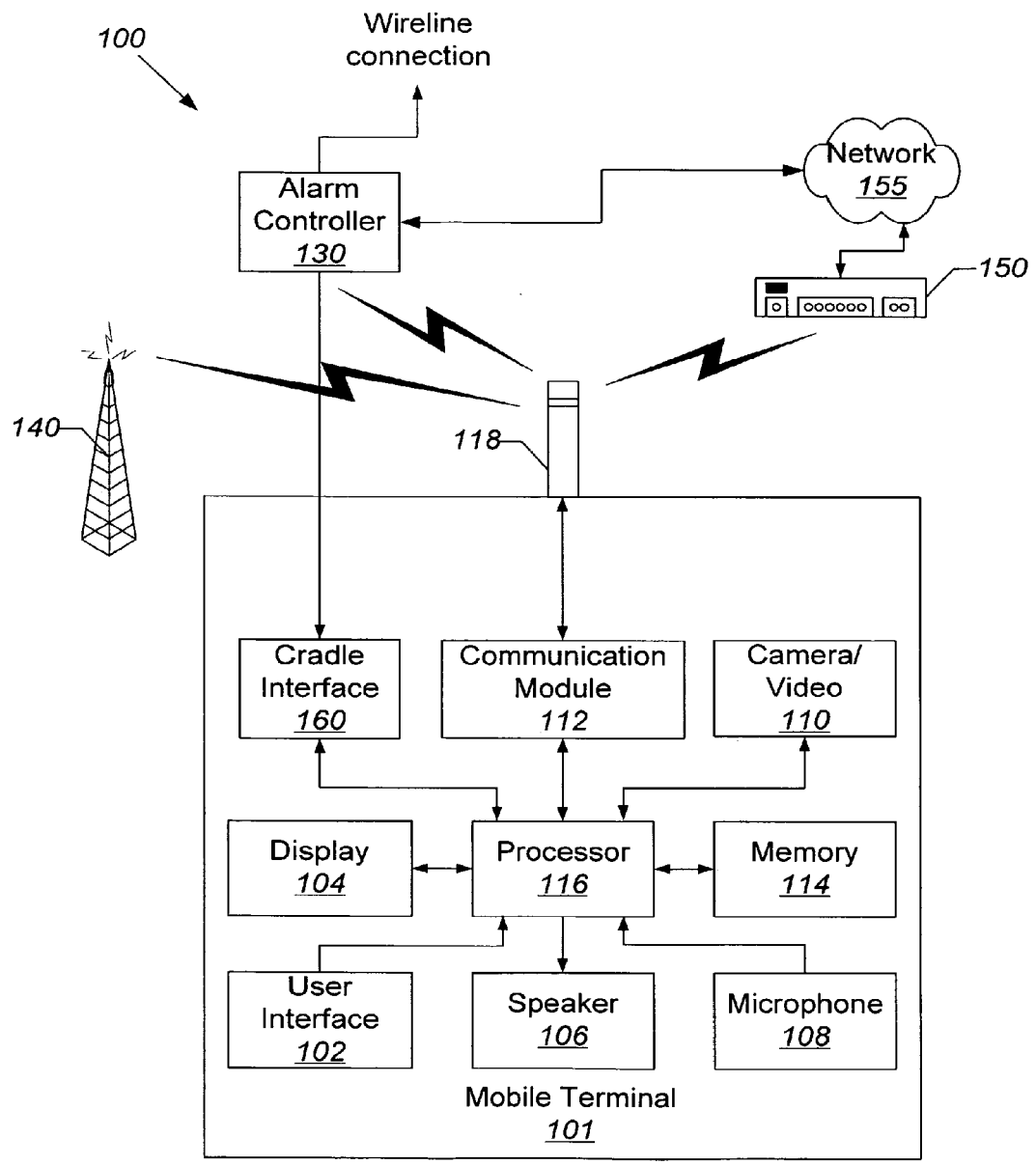
FIG. 1 is a block diagram that illustrates an alarm system in accordance with some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, electronic devices, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As used herein, the term "mobile terminal" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

For purposes of illustration, some embodiments of the present invention are described herein in the context of a mobile terminal. It will be understood, however, that the present invention is not limited to such embodiments and may be embodied generally as any electronic device that provides wireless communication functionality.

Some embodiments of the present invention are described herein with respect to an alarm controller contacting a monitoring service. As used herein, "monitoring service" may refer to a home security business or company, the police or other law enforcement authority, or, more generally, to any organization or person to be contacted upon detection of an alarm condition.

Some embodiments of the present invention arise from a realization that an alarm system auto-dialer may be rendered ineffective if the telephone line to a home, business, or other location is damaged by an intruder. Advantageously, some embodiments of the present invention may provide multiple communication techniques that may be used by an alarm controller to contact a monitoring service should an attempt to contact the monitoring service by one of the techniques be unsuccessful. For purposes of illustration, some embodiments of the present invention are described herein in which one of the communication techniques may be a wireless call as such a call type may be less likely to be thwarted by an intruder. It will be understood that the present invention is not limited to embodiments in which wireless technology is used to implement one or more of the multiple communication techniques. On the contrary, the present invention is not limited to any specific communication techniques or technologies as any communication techniques or technologies that are capable of contacting the monitoring service may be used.

Referring now to FIG. 1, an exemplary alarm system 100, in accordance with some embodiments of the present invention, includes a mobile terminal 101 and an alarm controller 130. The alarm controller 130 may be configured to communicate with a monitoring service through both a wireline connection and a wireless connection via the mobile terminal 101. The mobile terminal 101 is configured to communicate with one or more other wireless or wireline terminals over a direct wireless communication interface therebetween, over another wireless communication interface through one or more cellular base stations, over another wireless communication interface through a wireless local area network (WLAN) router, and/or over the public switched telephone network (PSTN) through one or more cellular base stations.

The mobile terminal 101 may be a mobile radiotelephone forming a part of a radiotelephone communication system as illustrated in FIG. 1. The system includes the mobile terminal 101 and a base station transceiver 140, which is part of a wireless communications network. In some embodiments of the present invention, the network includes a base station transceiver that includes the radio transceiver(s) that define an individual cell in a cellular network and communicates with the mobile terminal 101 and other mobile terminals in the cell using a radio-link protocol. It will be understood that, in some embodiments of the present invention, many base station transceivers may be connected through, for example, a mobile switching center and other devices to define the wireless communications network.

An exemplary mobile terminal 101, in accordance with some embodiments of the present invention, comprises a user interface 102 (i.e., a man machine interface (MMI)), a display 104, a speaker 106, a microphone 108, a camera/video recorder 110, a communication module 112, and a memory 114 that communicate with a processor 116. The communication module 112 comprises a transmitter circuit and a receiver circuit, which respectively transmit outgoing radio frequency signals to base station transceivers 140 and receive incoming radio frequency signals from the base station transceivers 140 via an antenna 118. The antenna 118 may be an embedded antenna, a retractable antenna or any antenna known to those having skill in the art without departing from the scope of the present invention. The radio frequency signals transmitted between the mobile terminal 101 and the base station transceivers 140 may comprise both traffic and control signals (e.g., paging signals/messages for incoming calls), which are used to establish and maintain communication with another party or destination. The radio frequency signals may also comprise packet data information, such as, for example, cellular digital packet data (CDPD) information. The foregoing components of the mobile terminal 101 may be included in many conventional mobile terminals and their functionality is generally known to those skilled in the art.

The display 104 may be any suitable display screen assembly. For example, the display screen 104 may be a liquid crystal display (LCD) with or without auxiliary lighting (e.g., a lighting panel).

The user interface 102 may include any suitable input device(s) including, for example, a touch activated or touch sensitive device (e.g., a touch screen), a joystick, a keyboard/keypad, a dial, a directional key or keys, and/or a pointing device (such as a mouse, trackball, touch pad, etc.). The speaker 106 generates sound responsive to an input audio signal. The user interface 102 can also include the microphone 108 coupled to an audio processor that is configured to generate an audio data stream responsive to sound incident on the microphone.

The processor 116 communicates with the memory 114 via an address/data bus. The processor 116 may be, for example, a commercially available or custom microprocessor. The memory 114 is representative of the one or more memory devices containing the software and data used to operate the mobile terminal. The memory 114 may include, but is not limited to, the following types of devices: cache, ROM, PROM, EPROM, EEPROM, flash, SRAM, and DRAM.

The communication module 112 is configured to communicate over one or more wireless interfaces. The communication module 112 can include a cellular communication module, a direct point-to-point connection module, and/or a WLAN module. In addition, the transceiver may include an infrared (IR) transceiver configured to transmit/receive infrared signals to/from other electronic devices via an IR port.

With a cellular communication module, the mobile terminal 101 can communicate via the base station(s) 140 of the network using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and Universal Mobile Telecommunications System (UMTS). The cellular base stations may be connected to a Mobile Telephone Switching Office (MTSO) wireless network, which, in turn, can be connected to a PSTN and/or another network.

A direct point-to-point connection module may include a direct RF communication module or a direct IR communication module. The direct RF communication module may include a Bluetooth module. With a Bluetooth module, the mobile terminal 101 can communicate via an ad-hoc network through a direct point-to-point interface. As shown, for example, in FIG. 1, the mobile terminal 101 may communicate with the alarm controller 130 using a direct point-to-point connection.

With a WLAN module, the mobile terminal 101 can communicate through a WLAN, e.g., a router 150 and a network 155 using a communication protocol that may include, but is not limited to, 802.11a, 802.11b, 802.11e, 802.11g, and/or 802.11i. As shown, for example, in FIG. 1, the mobile terminal 101 may communicate with the alarm controller 130 using a WLAN connection via the WLAN router 150 and network 155.

The mobile terminal 101 may further include a cradle interface 160 in accordance with some embodiments of the present invention. The cradle interface 160 may allow for activation of the mobile terminal 101 upon detection of an alarm condition. Moreover, the cradle interface 160 may allow for communication with the alarm controller 130 via a cradle as described in detail hereafter. That is, in some embodiments, the alarm controller 130 may have a wired connection to a cradle, such as, for example, a phone docking station where the mobile terminal 101 may be recharged. The alarm controller 130 may communicate with the mobile terminal 101 via the wired interface with the cradle to direct the mobile terminal 101 to make a call and/or transmit an alarm condition to a monitoring service.

Although FIG. 1 illustrates an exemplary alarm system 100, it will be understood that the present invention is not limited to such a configuration but is intended to encompass any configuration capable of carrying out the operations described herein.

Figure 2:
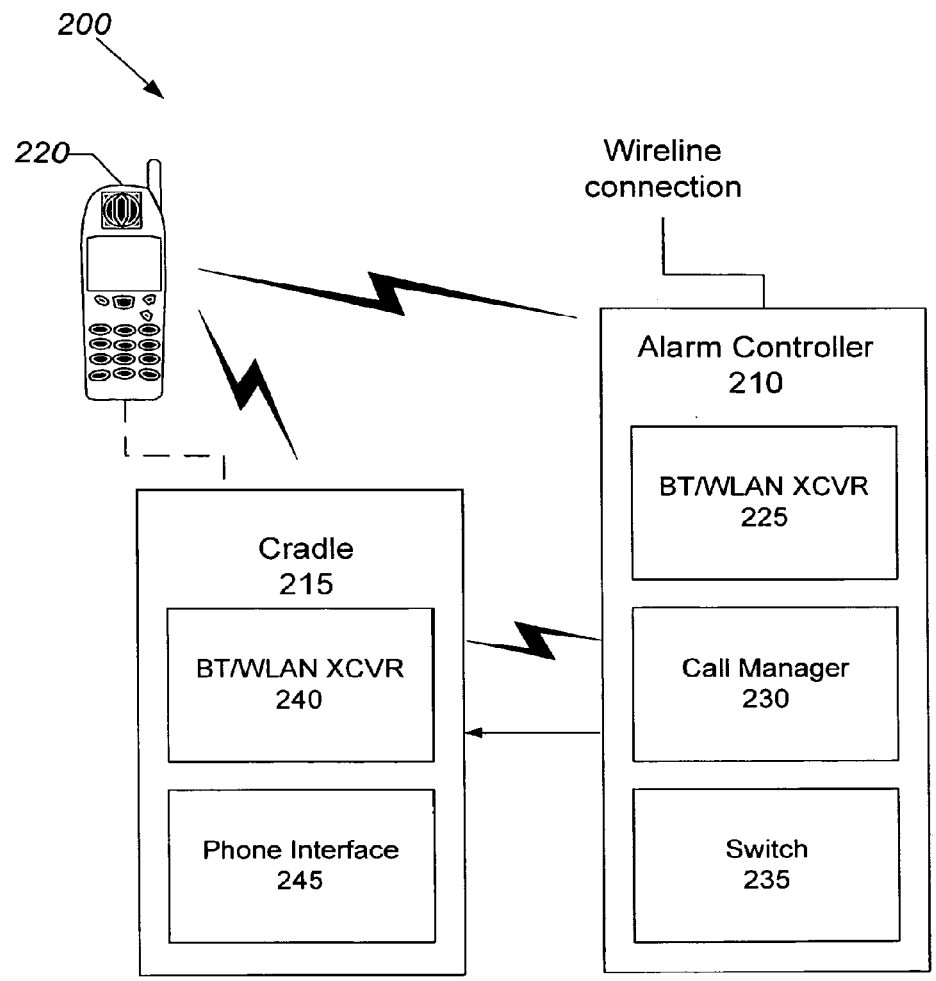
FIG. 2 is a block diagram that illustrates the alarm controller, cradle, and mobile terminal of FIG. 1 in more detail in accordance with some embodiments of the present invention.

FIG. 2 illustrates an alarm system 200 in which the alarm controller 210, cradle 215, and mobile terminal 220 are shown in more detail. The alarm controller 210 may be configured to communicate with a monitoring service through a wireline connection and a wireless connection. For example, the alarm controller 210 may include a Bluetooth/WLAN transceiver 225, a call manager 230, and a switch 235. The cradle 215 for the mobile terminal 220 may also include a Bluetooth/WLAN transceiver 240 and a phone interface 245. In operation, when the alarm controller 210 detects an alarm condition, then the call manager 230 may attempt to contact a monitoring service. The call manager 230 may configure the switch 235 to contact the monitoring service via the wireline connection or via a wired or wireless connection through the cradle 215 and/or mobile terminal 220. When attempting to contact the monitoring service via the wireless connection the alarm controller 210 may use the Bluetooth/WLAN transceiver 225 to activate the mobile terminal 220, if necessary, and to communicate with the mobile terminal 220 to direct the mobile terminal 220 to place a call and/or transmit an alarm condition to the monitoring service. In other embodiments, the alarm controller 210 may use the Bluetooth/WLAN transceiver 225 to communicate with the cradle 215 via the Bluetooth/WLAN transceiver 240, which in turn activates the mobile terminal 220 and establishes a connection with the mobile terminal 220 using the phone interface 245 to allow the alarm controller 210 to direct the mobile terminal 220 to place a call and/or transmit an alarm condition to the monitoring service. In still other embodiments, the alarm controller 210 may have a wired connection with the cradle 215 such that upon detection of an alarm condition, the alarm controller communicates with the cradle 215, which in turn activates the mobile terminal 220 via the phone interface 245. The alarm controller 210 may then direct the mobile terminal to place a call and/or transmit an alarm condition to the monitoring service via the wired connection between the alarm controller 210 and the cradle 215. As shown in FIG. 2, in accordance with various embodiments of the present invention, the alarm controller 210 can communicate with the cradle 215 using a wireless connection (e.g., a Bluetooth/WLAN connection) and/or a wireline connection therebetween.

The functionality of the hardware/software architecture of the alarm controller and/or cradle of FIGS. 1 and 2 may be implemented as a single processor system, a multi-processor system, or even a network of stand-alone computer systems, in accordance with various embodiments of the present invention.

Computer program code for carrying out operations of devices, mobile terminals, systems, and/or networks discussed above with respect to FIGS. 1 and 2 may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described hereinafter with reference to flowchart and/or block diagram illustrations of methods, mobile terminals, electronic devices, alarm systems, and/or computer program products in accordance with some embodiments of the invention.

These flowchart and/or block diagrams further illustrate exemplary operations of operating an alarm system in accordance with various embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 3:
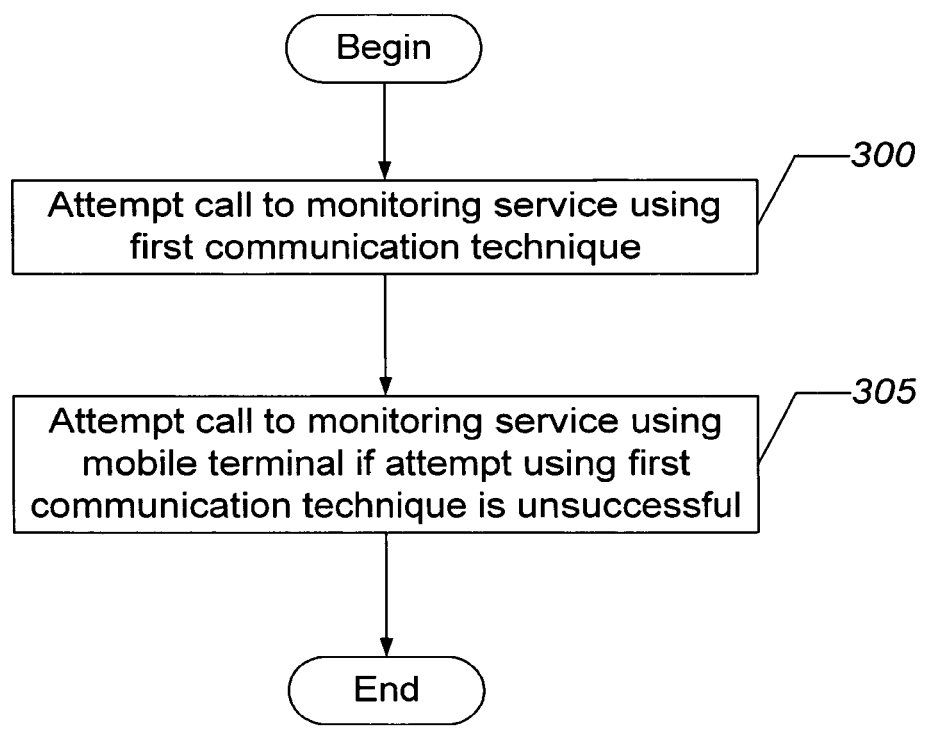
FIGS. 3 and 4 are flowcharts that illustrate operations for operating an alarm system in accordance with some embodiments of the present invention.

Referring now to FIG. 3, operations for operating an alarm system, according to some embodiments of the present invention, begin at block 300 where the alarm controller attempts to call a monitoring service using a first communication technique in response to detecting an alarm condition. For example, an intruder may trip a sensor and/or detector, which causes the alarm controller to activate any local warning system, e.g., lights, sirens, or the like and then attempt to call a monitoring service associated with the alarm system. As discussed above, the monitoring service may be a law enforcement authority, a business or company that installed the alarm system, and/or any person or entity (e.g., a neighbor) that the owner of the alarm system wants notified if an alarm condition is detected. The first communication technique may be, for example, a wireline connection such that a call attempt is made over the PSTN. It will be understood that the first communication technique is not limited to a wireline call over the PSTN and that any type of communication technology may be used in accordance with various embodiments of the present invention.

If the call attempt via the first communication technique is unsuccessful, then the alarm controller attempts to call the monitoring service using a mobile terminal at block 305. The alarm controller may communicate with the mobile terminal, either directly or through a cradle associated with the mobile terminal, to make a wireless call to the monitoring service. In some embodiments, the alarm controller may direct the mobile terminal to make a UMTS call over the Internet to contact the monitoring service. Advantageously, some embodiments of the present invention may allow a conventional mobile terminal, such as a cellular phone, to act as a backup communication mode for an alarm system. For example, in some embodiments, the alarm controller may be configured to communicate via a wired and/or wireless connection with a cradle that may be used to recharge the mobile terminal. The mobile terminal may even be powered off, for example, to ensure that the mobile terminal is not handling another call at a time that it is intended to be available as a backup mode of communication for an alarm system. Upon detection of an alarm condition, the alarm controller may activate the mobile terminal using wireless technology, such as Bluetooth or WLAN technology, or directly via a wired connection to the cradle.

Figure 4:
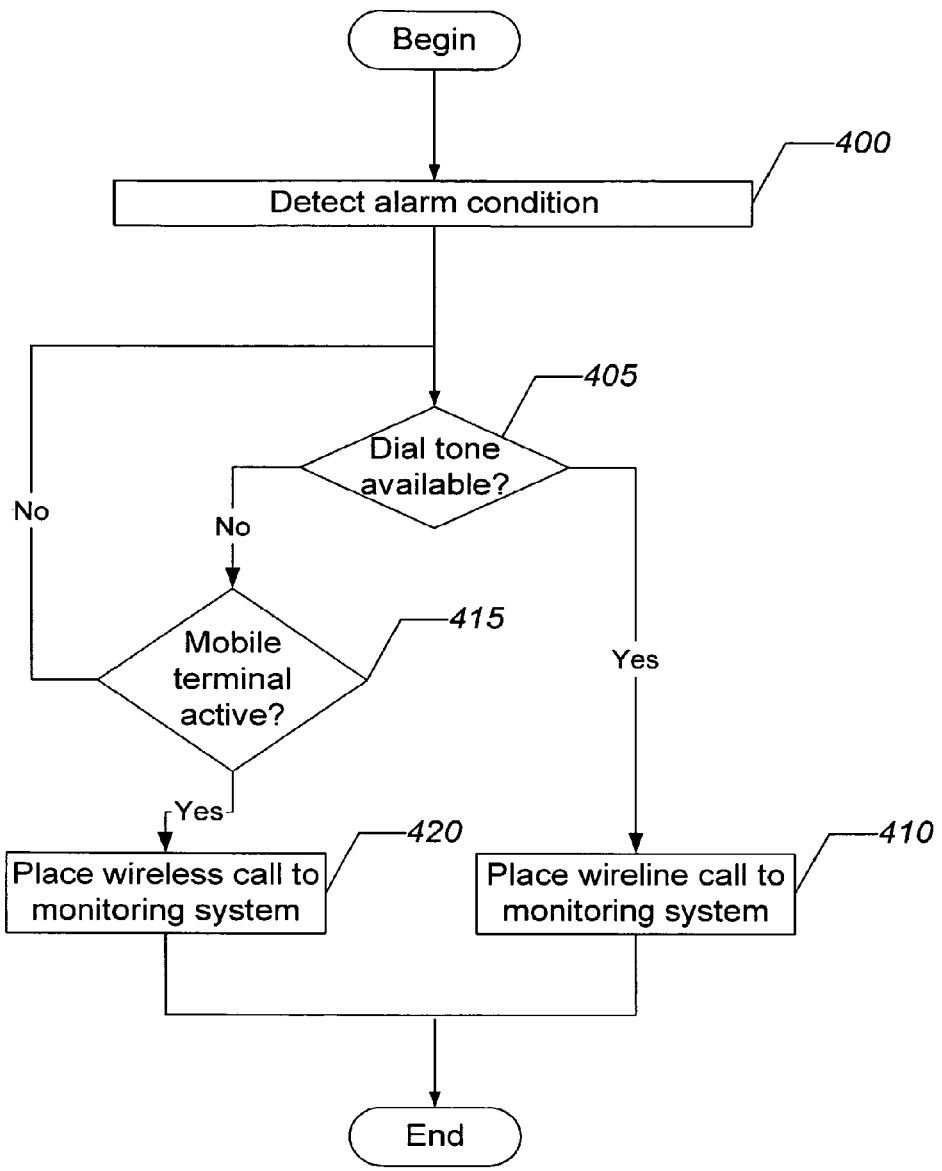

Referring now to FIG. 4, operations for operating an alarm system in which a wireline connection is used as a first communication technique and a wireless connection is used as a second communication technique, in accordance with further embodiments of the present invention, begin at block 400 where the alarm controller detects an alarm condition. A determination is made at block 405 whether dial tone is available on the wireline connection. If dial tone is available, then a call is placed to the monitoring system over the wireline connection at block 410. If, however, dial tone is not available on the wireline connection, such as, for example, if an intruder has intentionally damaged a phone line associated with the property, then the alarm controller may, in some embodiments, operate a switch to connect to a wireless connection and determine at block 415 if a mobile terminal is active. As discussed above, the alarm controller may communicate directly with a mobile terminal or may communicate with the mobile terminal via a cradle that is designed to receive the mobile terminal therein. Moreover, in some embodiments, the mobile terminal may be activated using wireless technology or through the cradle via a wired connection upon detection of the alarm condition at block 400. If the mobile terminal is determined to be active, then a wireless call is made to the monitoring service at block 420 through the mobile terminal at the direction of the alarm controller. If, however, the mobile terminal is determined to be inactive and is not capable of being activated as discussed above, then operations repeat beginning at block 405 until a call is made to the monitoring system via the wireline connection or the wireless connection.

For purposes of illustration, the present invention has been described herein by way of example in which only two communication techniques (e.g., a wireline connection and a wireless connection) are used in attempting to contact a monitoring service upon detection of an alarm condition. It will be understood that any number of communication techniques may be used in accordance with various embodiments of the present invention. Moreover, the greater the number of communication techniques available to the alarm controller, the more likely it may be that the alarm controller will be successful in contacting the monitoring service.

The flowcharts of FIGS. 3 and 4 illustrate the architecture, functionality, and operations of embodiments of methods, systems, and/or computer program products for operating an alarm system in which multiple communication techniques may be used to contact a monitoring service. In this regard, each block represents a module, segment, or portion of code, which comprises one or more executable instructions for implementing the specified logical function(s). It should also be noted that in other implementations, the function(s) noted in the blocks may occur out of the order noted in FIGS. 3 and 4. For example, two blocks shown in succession may, in fact, be executed substantially concurrently or the blocks may sometimes be executed in the reverse order, depending on the functionality involved.

Many variations and modifications can be made to the embodiments without substantially departing from the principles of the present invention. All such variations and modifications are intended to be included herein within the scope of the present invention, as set forth in the following claims.

The invention claimed is:

1. A system, comprising:
a mobile terminal, the mobile terminal initially being in a powered off state; and
an alarm controller
activating the mobile terminal using a wireless technology upon detection of an alarm condition, and
attempting a call to a neighbor via the mobile terminal upon activating a local warning system, the call being a Universal Mobile Telecommunications System call over a packet based network, the call being attempted upon a first communication technique being unsuccessful, the neighbor being a contact designated for receiving the call after the local warning system is activated,
wherein the local warning system is activated upon detection of the alarm condition, wherein the alarm condition comprises an intruder tripping a sensor, the local warning system being at least one of a light or a siren, and
wherein the first communication technique is a telephone call made over a public switched telephone network.

2. The system of claim 1, wherein the alarm controller attempts an additional Universal Mobile Telecommunications System call to a law enforcement authority.

3. The alarm system of claim 1, wherein the mobile terminal communicates with the alarm controller via a direct wireless communication interface.

4. The alarm system of claim 3, wherein the direct wireless communication interface comprises a communication protocol having a range of less than 100 meters.

5. The alarm system of claim 1, further comprising a cradle for receiving the mobile terminal therein, the cradle being communicatively coupled to the alarm controller.

6. The alarm system of claim 5, wherein the cradle comprises a phone interface, the phone interface activating the mobile terminal in response to the local warning system being activated.

7. The alarm system of claim 5, wherein the alarm controller communicates with the cradle via a direct wireless communication interface comprising a communication protocol having a range of less than 100 meters.

8. The alarm system of claim 5, wherein the cradle communicates with the mobile terminal via a direct wireless communication interface comprising a communication protocol having a range of less than 100 meters.

9. The alarm system of claim 1, wherein the first communication technique is a wireline call via a wireline connection.

10. The alarm system of claim 9, wherein the alarm controller further comprises a switch, the switch selecting the wireline connection for the wireline call and selecting the mobile terminal for attempting the call to the mobile terminal.

11. A method, comprising:
utilizing a processor for activating a mobile terminal using a wireless technology upon detection of an alarm condition; and utilizing the processor for attempting a call to a neighbor via the mobile terminal upon activating a local warning system, the call being a Universal Mobile Telecommunications System call over a packet based network, the call being attempted upon a first communication technique being unsuccessful, the neighbor being a contact designated for receiving the call after the local warning system is activated;

wherein the local warning system is activated upon detection of the alarm condition, wherein the alarm condition comprises an intruder tripping a sensor, the local warning system being at least one of a light or a siren, and wherein the first communication technique is a telephone call made over a public switched telephone network.

12. The method of claim 11, wherein an additional Universal Mobile Telecommunications System call to law enforcement authority is attempted.

13. The method of claim 11, wherein attempting the call to the neighbor using the mobile terminal comprises communicating with the mobile terminal via a direct wireless communication interface.

14. The method of claim 13, wherein the direct wireless communication interface comprises a communication protocol having a range of less than 100 meters.

15. The method of claim 11, wherein a cradle is provided to receive the mobile terminal in the cradle for attempting the call in response to the local warning system being activated.

16. The method of claim 11, wherein upon the first communication technique being unsuccessful, a switch is operated to connect the alarm controller to the mobile terminal.

17. A non-transitory computer-readable medium having a computer program product stored thereon, the computer program product comprising instructions that, when executed by a processor, cause the processor to perform operations comprising:

activating a mobile terminal using a wireless technology upon detection of an alarm condition; and attempting a call to a neighbor via the mobile terminal upon activating a local warning system, the call being a Universal Mobile Telecommunications System call over a packet based network, the call being attempted upon a first communication technique being unsuccessful, the neighbor being a contact designated for receiving the call upon the activation of the local warning system, wherein the local warning system is activated upon detection of the alarm condition, wherein the alarm condition comprises an intruder tripping a sensor, the local warning system being at least one of a light or a siren, and wherein the first communication technique is a telephone call made over a public switched telephone network.

18. The computer-readable medium of claim 17, wherein the processor attempts the call to the neighbor via a direct wireless communication interface.

19. The computer-readable medium of claim 17, wherein a cradle is provided to receive the mobile terminal in the cradle for attempting the call in response to the local warning system being activated.

20. The computer-readable medium of claim 17, wherein the processor attempts an addition Universal Mobile Telecommunications System call to a law enforcement authority.

* * * * *